March 19, 1929.  G. S. MORISON  1,706,180
EPICYCLIC DOUBLE REDUCTION TRANSMISSION
Filed June 23, 1926
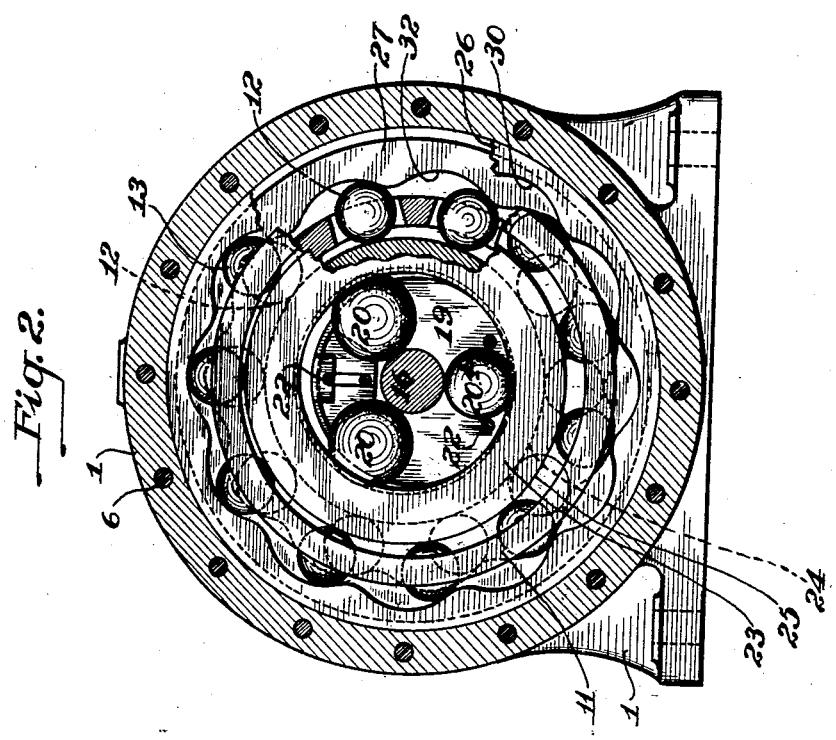
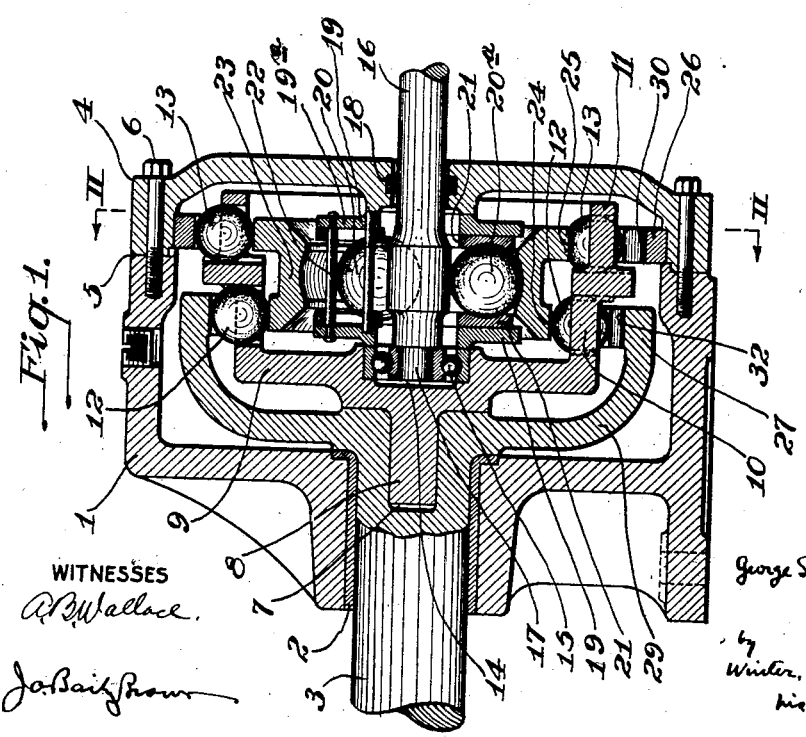
WITNESSES
George Smith Morison,
INVENTOR,
by Winter, Brown & Critchlow
his attorneys Patented Mar. 19, 1929.

1,706,180

UNITED STATES PATENT OFFICE.

GEORGE SMITH MORISON, OF PITTSBURGH, PENNSYLVANIA, ASSIGNOR TO MORISON INCORPORATED, OF PITTSBURGH, PENNSYLVANIA, A CORPORATION OF DELAWARE.

EPICYCLIC DOUBLE-REDUCTION TRANSMISSION.

Application filed June 23, 1926. Serial No. 117,963.

This invention relates to power transmission devices; more particularly to a gearless transmission adapted to effect great reduction in the speeds of relatively movable machine elements or the like.

It is among the objects of this invention to provide a power transmission device which is adapted to effect a relatively great reduction of speeds between a driving and a driven element in which the driving and driven members are journaled for rotation in coaxial alignment and in which the transmutation elements comprise a minimum number of simple correlated parts, compactly housed in a unitary casing member, and arranged to constitute a comparatively quiet, mechanically efficient, durable, and compact power transmission unit.

Another object of this invention is to utilize in a power transmission device a plurality of rolling members cooperating with an eccentrically driven and driving thrust member and surrounding corrugated races, the thrust member having an epicyclic movement relative to the surrounding corrugated races, the parts being so proportioned and arranged that the rolling members shall at all times be in contact with the circular thrust member and cooperating corrugated races.

In accordance with the present invention a great reduction of speed or speed ratio is effected by utilizing two series or groups of roller members cooperating respectively with two corrugated races and a single epicyclically moving thrust member in the manner hereinafter set forth.

In the accompanying drawing constituting a part hereof, and in which like reference characters designate like parts, Fig. 1 is a view partially in section and partially in elevation of a transmission device embodying the principles of my invention; and Fig. 2 is a similar view taken along the line II—II, Fig. 1.

Referring to the several figures of the drawings, the structure therein illustrated comprises a casing 1 provided with a journal bearing 2 for rotatably journaling a shaft member 3 which constitutes the driven element of the power transmission device. An end bracket 4 having an off-set portion 5 adapted to seat on a complementary shaped portion of the housing 1 is secured to the latter by a plurality of cap bolts 6 extending through openings provided in the members 1 and 4, respectively. The shaft member 3 is provided with a central aperture 7 constituting a bearing for a shaft 8 formed integrally with a roller receiving cage member 9 having off-set portions 10 and 11 provided respectively with recesses for receiving two groups or series of rollers 12 and 13. The two series of rollers are divided into separate groups by the off-set portions for a purpose hereinafter stated. The several rollers of each group are of the same dimensions, and preferably those of the two groups are also identical. That makes them interchangeable and simplifies the proportioning of other parts.

The cage member 9 is provided with a central recess 14 for receiving an anti-friction or ball bearing member 15 which journals a shaft 16 at a restricted end portion 17 thereof, and the shaft member 16 is further rotatably journaled through an air-tight packing 18 provided in the bracket member 4, and a plurality of rollers 20, 20 and 20$^a$. The shaft 16 is in coaxial alignment with the shaft 3 and in the operation herein described constitutes the driving member of the transmission device.

A cage member 19 comprising a pair of disks 19$^a$ carries the rollers 20, 20, 20$^a$, in suitable bearing pads 21 attached thereto. The disks 19$^a$ are joined by rivets or rods 22 to retain the rollers 20, 20, 20$^a$ in their relative positions as shown in Fig. 2. These roller members are of different sizes, the two similar upper members 20, 20, as shown in Fig. 2 being larger in diameter than the lower member 20$^a$, whereby the rollers cooperate with an outer eccentrically mounted rotatable race 23 to produce a wedge action between the rollers, the shaft member 16, and the race 23. By this arrangement member 23 operates as a driven and driving thrust ring having eccentric rotative movement relative to the axis of rotation of the shaft 16.

Although the members 12, 13, 20 and 20$^a$ are shown herein as spherical in shape, the broad term rollers is used for all of them for the reason that their function is merely to act as rollers between the races with which they contact inside and outside, and other forms of rollers may be used, as for example cylindrical or frusto-conical rollers. The term rollers throughout is therefore used in a comprehensive or generic sense.

The race member 23 is provided with external concentric races 24 and 25, of different diameters, in alignment respectively with the two series of roller-retaining apertures of the cage member 9 and adapted to engage the series of roller members 12 and 13, respectively.

An outer race 26, provided with corrugations 30 (Fig. 2), is secured to the bracket 4 in a fixed position, and the shaft member 3 is provided with a similar corrugated race 27 which is formed by an integral extension 29 of the shaft or otherwise associated therewith in any suitable manner so as to be rotatable with the shaft and by the means described.

The corrugations of the races 26 and 27 are in the form of arcs of circles the radii of which equal the diameter of the roller members 12 and 13 with which they cooperate, respectively. The number of corrugations in the races 26 and 27, and the number of rollers 12 and 13 in the respective groups may be varied, subject to certain mathematical limitations, in accordance with the speed ratio it is desired to obtain.

In operation, the drive shaft 16 is the high speed element and may constitute the armature shaft of a motor, the drive shaft of any prime mover, or a connection thereto. The rotation of the drive shaft rotates the ball or roller members 20, 20, 20$^a$, which, by virtue of their engagement also with the thrust ring 23, tend to rotate and revolve the latter in a direction opposite to the direction of rotation of the drive shaft 16. The thrust ring 23, by virtue of its eccentric epicyclic movement, progressively pushes the circular members 12 and 13 into the corrugations of the races 26 and 27, respectively. Since the race 26 is fixed or stationary it acts as a fulcrum for the roller members 13 as they are driven down the inclined faces of the corrugations 30 of the race 26 under pressure of the thrust of race 25. The effect by reaction of the rolling members 13 on the fixed surface of race 26, is a driving rotative movement of the cage member 9 in which they are carried, the rotation of the cage being in opposite direction to that of the rollers 13 but in the direction of travel of the rollers 13 as a whole.

The speed of rotation of the thrust ring 23 is governed by the speed of rotation and rolling motion of the rollers 13 as they travel on the slopes of the corrugations of the race 26. The cage member retaining the rollers 20, 20, 20$^a$, is free to rotate and it tends to rotate in the direction of rotation of the drive shaft 16, driven by the roller planetary members 20, 20, 20$^a$. This tendency of the cage carrying rollers 20, 20, 20$^a$, is however, dependent on rotation of the race 23, since if that member be held against any rotation whatever the cage will necessarily be rotated at a speed determined entirely by peripheral speed of the shaft 16 and the rollers 20, 20, 20$^a$. On the other hand if the race 23 be free to rotate the cage may stand still, rotation of the shaft 16 being translated through rotation of rollers 20, 20, 20$^a$ on fixed axes into rotation of race member 23. Any variation in comparative speeds of rotation between the two extreme conditions of zero for either as just stated may be obtained by wholly or partly restricting the rotation of one while leaving the other free to rotate. Therefore, in the present case, since the cage carrying the rollers 20, 20, 20$^a$ is freely mounted and can therefore be considered as a floating member, adjusting its speed of rotation as required by the speed of rotation, or even non-rotation of race member 23, the latter may be and is controlled by external resistance. Consequently the race member 23 is directly governed in respect to speed of rotation by reaction on it of rollers 13 as they are forced to roll down the inclined faces of the corrugated race 26 by the progressive or epicyclic thrust resulting from the eccentric movement of the ring 23 by virtue of revolution of the unequally sized rollers 20, 20$^a$, between that ring and the shaft 16.

The number of corrugations 32 in the race 27 is less than the number of similar corrugations 30 in the race 26, and the number of rollers 12 is one less than the number of corrugations 32. The successive corrugations of the races 27 and 26 will therefore necessarily be out of alignment in relative radial position, as shown in Fig. 2. Accordingly when the rollers 13 cooperating with the race 26 are driven downwardly into the lower portions between the corrugations 30 of that race, the next adjacent or corresponding rollers 12 of the other group cooperating with the corrugations 32 of the race 27 will drive the movable race 27 a slight distance in order to compensate for the difference in position of the rollers that would otherwise result, producing a creepage of the rotatable member 27 in a direction opposite to the direction of rotation of the cage member 9. Since the race member 27 constitutes an integral part of the driven shaft 3, the amount of creepage governs the speed of rotation of the driven shaft 3, which will be relatively very small as compared to the speed of rotation of the drive shaft 16.

The eccentrically driven rotatable thrust ring 23, the rollers 13 and the corrugated race 26, are in the nature of an epicyclic gear cooperating with an outer rack. Such arrangements produce a reduction of speeds much as does the commonly termed wabble gear drive. Thus where there are nineteen rollers 13 cooperating with a race 26 having twenty corrugations, the retaining cage 9 will make one complete rotation for nineteen revolutions of the cage 19 cooperating with the thrust ring 23 which is effective in pushing or forcing the balls against the corrugations.

If the number and size of corrugations of the races 26 and 27 were the same and the series of rollers 12 and 13 were equal in number and size there would be no resultant displacement or creepage of the movable race 28. The greatest reduction in speed between the driven cage 9 and the driven element 3, of which the race 27 constitutes an integral part, is effected by the least difference in number of corrugations on the respective races 26 and 27.

By making the radii of the corrugations equal to the diameter of the rollers, a substantially constant contact between the rollers and corrugated paths of the races is secured. This lessens the wear and noise in operation and also lessens the strain on all bearings.

A transmission device made in accordance with this specification provides a simple and compact apparatus for effecting an enormous reduction in speed of relatively movable parts, with elimination of gear teeth, and with apparatus that may be manufactured at any well equipped machine shop, in cooperation with rollers of standard sizes that are universally available.

I claim:

1. In a power transmission device, the combination with a driving and a driven element of a plurality of roller retaining cage members, series of rollers respectively carried by said cage members, a double roller race disposed around one series of said rollers and cooperatively engaged with all of said rollers, a fulcrum member for engagement with one series of said rollers, and means for effecting driving engagement of another series of said rollers with said driven element.

2. In a power transmission device, the combination with a driving and a driven element of a plurality of roller retaining cage members, series of rollers carried by said members, a double roller race disposed around one series of rollers and cooperatively engaged with all of said series of rollers, a fulcrum member for engagement with one of said series of rollers, and a roller engaging member associated in fixed relation with said driven element for driving engagement with another series of said balls or rollers.

3. In a power transmission device, the combination with a driving and a driven element journalled for rotation in coaxial alignment, of a plurality of roller retaining cage members mounted concentrically with said elements, series of rollers carried respectively by said cage members, a race member disposed between and in engagement with said series of rollers, a corrugated race fixed to constitute a fulcrum for one series of rollers, and a second corrugated race rotatable with said driven element and adapted to be driven by engagement with one of said series of rollers.

4. In a power transmission device, the combination with a driving and a driven element journalled for rotation in coaxial alignment, of a plurality of roller retaining cage members mounted concentrically with said elements, series of rollers carried by said cage members, a race member constituting a thrust ring disposed between and in engagement with said series of rollers and adapted for eccentric movement relative to the axes of said driving and driven elements, a corrugated race fixed to constitute a fulcrum for one of said series of rollers, and a corrugated race rotatable with said driven element adapted for driven engagement with another of said series of rollers.

5. In a power transmission device, the combination with a driving and a driven element journalled for rotation in coaxial alignment of two roller retaining cage members mounted concentrically with said elements, a series of rollers carried by the first of said cage members and adapted to constantly and operatively engage said driving element, two of said rollers having unequal diameters, rollers arranged in two unequal series in the other cage member, a thrust ring disposed around and adapted for engagement with the first mentioned series of rollers and adapted to engage the two series of rollers of said second mentioned cage, a stationary corrugated race constituting a fulcrum for one of said series of rollers in the second cage, and a movable corrugated race adapted to be driven by engagement with the other of said series of rollers carried by the second cage member, said movable corrugated race being positively connected to the driven element.

6. In a power transmission device, the combination with a driving and a driven element of a plurality of roller retaining cage members, rollers carried by said cages and operatively engaged with said elements, and a corrugated race for one series of said rollers in which the corrugations are bounded by arcs of equal circles the radii of which is equal to the diameters of the rollers with which they cooperate.

7. In a power transmission device, the combination with a driving and a driven element journalled for rotation in coaxial alignment, of a plurality of roller retaining cage members journalled concentrically therewith, a roller race disposed intermediate said cage members, a plurality of rollers carried by one of said cage members and operatively engaged with said drive element and said race, two of said rollers having unequal diameters, a plurality of rollers carried in groups by the other of said cage members, a stationary race in alignment with and adapted to engage one of said groups of rollers, and a race rotatable with said driven element and in engagement with the other of said groups of rollers, said stationary and said last-named rotatable races being adapted to cooperate to effect rotation of said driven element.

8. A power transmission device comprising a drive shaft having a fixed axis, a series of not less than three rollers circumferentially spaced apart on and in contact with the drive shaft, two of said rollers having unequal diameters, a ring member surrounding and in contact with said unequal rollers, said ring member being adapted to be rotated and revolved by travel of the unequal rollers on the drive shaft, a large and a small race on the exterior periphery of said ring, a cage member surrounding the ring mounted concentrically with the drive shaft and having therein a large series and a small series of spaced rollers adapted to contact respectively with said large and small races on said ring member, a fixed outer race in cooperative alignment with said large race and having its operative face divided into corrugations, the large series of rollers being positioned between and in contact with said large race and said fixed corrugated race, a concentrically mounted movable outer corrugated race in operative alignment with said small race, the rollers of said small series being positioned between and in contact with said small race and said movable corrugated race, whereby to transmit rotation of the drive shaft to rotation of the movable corrugated race with reduction of speed of rotation.

9. The combination of elements recited in claim 8 further characterized by the rollers of the said small and large series being one less in number, respectively, than the number of corrugations in the outer movable race and the outer fixed race, respectively.

10. The combination of elements recited in claim 8 further characterized by the fact that the corrugations of the two outer races are bounded by arcs of equal circles the radii of which are respectively equal to the diameters of the rollers adapted to be in contact therewith.

11. The combination of elements recited in claim 8 further characterized by the fact that the corrugations of the two outer races are bounded by equal arcs, and the rollers of the large and small series are all equal in diameter.

12. In a power transmission device, the combination with rotary driving and driven elements adapted for coaxial rotation of a roller-retaining cage member rotatably mounted concentrically with said driving element, a series of revoluble rollers adapted to constantly and operatively engage said driving element, two of the said rollers having unequal diameters, other rollers arranged in two unequal series in different planes and carried in the said cage member, a thrust ring positioned eccentrically with respect to the driving member disposed around and in engagement with the first mentioned series of rollers, and having a periphery comprising two circular faces of different diameters adapted respectively to engage the two unequal series of other rollers, an outer stationary corrugated race constituting a fulcrum for one of said series of rollers carried by the cage, and a movable corrugated race adapted to be engaged and driven by the other of said series of rollers carried by the cage, said movable corrugated race being positively connected to or constituting the driven element.

13. In a power transmission device, the combination with a driving and a driven element mounted for coaxial rotation, of a rotatable roller-retaining cage member mounted coaxially with the driving member, an eccentrically positioned ring disposed inside said cage member, a plurality of inner rollers operatively engaging said driving element and said ring, two of said inner rollers having unequal diameters, a plurality of equally sized outer rollers arranged in two unequal series in different planes carried by and revoluble with the said cage member and engaging the exterior face of said ring, an outer stationary race in alignment with and adapted to engage one of said series of outer rollers, and a rotatably-mounted second outer race in engagement with the other of said series of outer rollers and connected to or constituting the driven element, whereby to transmit rotary motion of the driving element to rotary motion of the driven element at a different rate of rotation.

14. In a power transmission device, the combination with a rotary driving element of a series of revoluble rollers mounted upon the driving element as a race, two of said rollers having unequal diameters, a ring having an inner and two unequal outer races, the inner race bearing upon and surrounding said rollers whereby the ring is eccentrically positioned with respect to the driving element, a rotatable cage member surrounding and coaxial with the driving element, two unequal series of rollers held in and revoluble with the cage and bearing respectively on the two unequal outer races of said ring, a fixed corrugated fulcrum race outside of and in contact with one of said series of caged rollers, and a rotatably mounted corrugated race outside of and in contact with the other series of rollers in said cage and adapted to be driven thereby.

15. The combination of claim 14, the rollers of the two series in said cage being respectively of diameter equal to the radius of the corrugations in said outer races.

16. The combination of claim 14, the number of rollers in one outer series being one less than in the other outer series.

17. In a power transmission device the combination of an eccentrically driven rotatably and revolubly mounted ring member having two unequally sized circular tracks on its outer periphery, a cage member rotatably mounted on a fixed axis and surrounding the eccentric member, a series of rollers mounted in the cage revoluble therewith free to move in radial relation thereto and in contact with one of the tracks on the eccentric member, a second series of rollers similarly mounted in the cage and seated upon the other track of the eccentric member, corrugated races surrounding and in contact with said series of rollers, one of said corrugated races being fixed, the other corrugated race being rotatably mounted and coaxial with said cage member, whereby to drive the movable corrugated member.

18. In a power transmission device the combination of an eccentrically driven rotatable and revoluble member having two unequally sized circular tracks on its outer periphery, a cage member rotatably mounted on a fixed axis and surrounding the eccentric member, the axis of revolution of the eccentric member and of rotation of the cage member being the same, a series of rollers mounted in the cage revoluble therewith free to move in radial relation thereto and in contact with one of the tracks on the eccentric member, a second series of rollers similarly mounted in the cage and seated upon the other track of the eccentric member, all the said rollers having equal diameters, two corrugated races surrounding and in contact with said series of rollers, the corrugation of said races being equal arcs having a radius equal to the diameter of the rollers cooperating therewith, the number of corrugations of each race being one greater than the number of rollers in the series of rollers bearing thereon, one of said corrugated races being fixed, the other corrugated race being rotatably mounted and adapted to be driven by the said rollers bearing thereon.

In testimony whereof, I sign my name.

GEORGE SMITH MORISON.